(12) United States Patent
Horn et al.

(10) Patent No.: US 10,595,247 B2
(45) Date of Patent: Mar. 17, 2020

(54) PROVIDING SERVICES TO A ROAMING USER EQUIPMENT

(71) Applicant: Telefonaktiebolaget LM Ericsson (publ), Stockholm (SE)

(72) Inventors: Uwe Horn, Aachen (DE); Branko Djordjevic, Herzogenrath (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 22 days.

(21) Appl. No.: 15/762,265

(22) PCT Filed: Sep. 28, 2015

(86) PCT No.: PCT/EP2015/072286
§ 371 (c)(1),
(2) Date: Mar. 22, 2018

(87) PCT Pub. No.: WO2017/054841
PCT Pub. Date: Apr. 6, 2017

(65) Prior Publication Data
US 2018/0270724 A1    Sep. 20, 2018

(51) Int. Cl.
*H04W 36/08*    (2009.01)
*H04W 24/02*    (2009.01)
(Continued)

(52) U.S. Cl.
CPC .............. *H04W 36/08* (2013.01); *H04W 8/08* (2013.01); *H04W 8/186* (2013.01); *H04W 24/02* (2013.01); *H04L 12/4641* (2013.01)

(58) Field of Classification Search
None
See application file for complete search history.

(56) References Cited

U.S. PATENT DOCUMENTS

2014/0293885 A1    10/2014   Agrawal et al.
2015/0180730 A1    6/2015    Felstaine et al.
(Continued)

FOREIGN PATENT DOCUMENTS

EP    2770800 A1    8/2014
EP    3007391 A1    4/2016
(Continued)

OTHER PUBLICATIONS

European Telecommunications Standards Institute, "Network Functions Virtualisation (NFV); Management and Orchestration", ETSI GS NFV-MAN 001 V1.1.1, Dec. 2014, pp. 1-184.
(Continued)

*Primary Examiner* — Saba Tsegaye
(74) *Attorney, Agent, or Firm* — Coats & Bennett, PLLC (57) ABSTRACT

The application relates to Network Function Virtualisation as standardised by ETSI GS NFV002 VI.2.1. The standard provides for dynamic instantiation and management of VNF instances. When using base stations as platforms on which VNFs can be instantiated, it has to be decided how this is done in an efficient way. The application proposes that in case a UE moves from an area covered by a source base station (210) to an area covered by a target base station (220), at least one VNF (250) is deployed on the target base station. This VNF may be a clone of a VNF (240) hosted by the source bases station.

17 Claims, 8 Drawing Sheets

(51) Int. Cl.
*H04W 8/08* (2009.01)
*H04W 8/18* (2009.01)
*H04L 12/46* (2006.01)

(56) References Cited

U.S. PATENT DOCUMENTS

| | | | |
|---|---|---|---|
| 2015/0288541 A1* | 10/2015 | Fargano | H04L 43/08 709/225 |
| 2017/0086111 A1* | 3/2017 | Vrzic | H04W 36/023 |
| 2017/0086118 A1* | 3/2017 | Vrzic | H04W 36/26 |
| 2017/0164253 A1* | 6/2017 | Fujinami | H04W 76/10 |

FOREIGN PATENT DOCUMENTS

| | | |
|---|---|---|
| WO | 2014192259 A1 | 12/2014 |
| WO | 2015082013 A1 | 6/2015 |
| WO | 2015106822 A1 | 7/2015 |
| WO | 2017168205 A1 | 10/2017 |

OTHER PUBLICATIONS

European Telecommunications Standards Institute, "Network Functions Virtualisation (NFV); Architectural Framework", ETSI GS NFV 002 V1.1.1, Oct. 2013, pp. 1-21.
NGMN Alliance, "5G White Paper V1.0", NGMN 5G Initiative, Feb. 17, 2015, pp. 1-125.
Ericsson, "Some observations on NFV", 3GPP TS-RAN WG3 Meeting #93bis, Oct. 10-14, 2016, pp. 1-5, Sophia Antipolis, France, R3-162426.

\* cited by examiner

VNF Manager, VNF building

Figure 7

VNF Manager, partial handing-over

Figure 8        Source Radio Base Station

Figure 9        Target Radio Base Station

VNF Manager, Apparatus

Figure 10

Radio Base Station, Apparatus

Figure 11

PROVIDING SERVICES TO A ROAMING USER EQUIPMENT

TECHNICAL FIELD

The non-limiting and exemplary embodiments of the present disclosure generally relate to virtualized communication networks, and specifically to a system, method, node and computer program for provisioning of services to a roaming UE.

BACKGROUND

An ongoing trend in the telecommunication industry is to "move network functions into the cloud", meaning that instead of using dedicated and specialized (but expensive) processing hardware, to run the corresponding network functions in generic data centers comprising bulks of general purpose (but cheap) processing hardware. These data centers may even be owned and operated by a different company and the processing power would be rented dynamically, depending on the need and the price.

With the ever increasing processing power of computing hardware, it also becomes possible to use the spare resources of network nodes to act as platform for hosting more/other network functions. In this scenario the network node would also act as a mini-datacenter.

Figure 1:
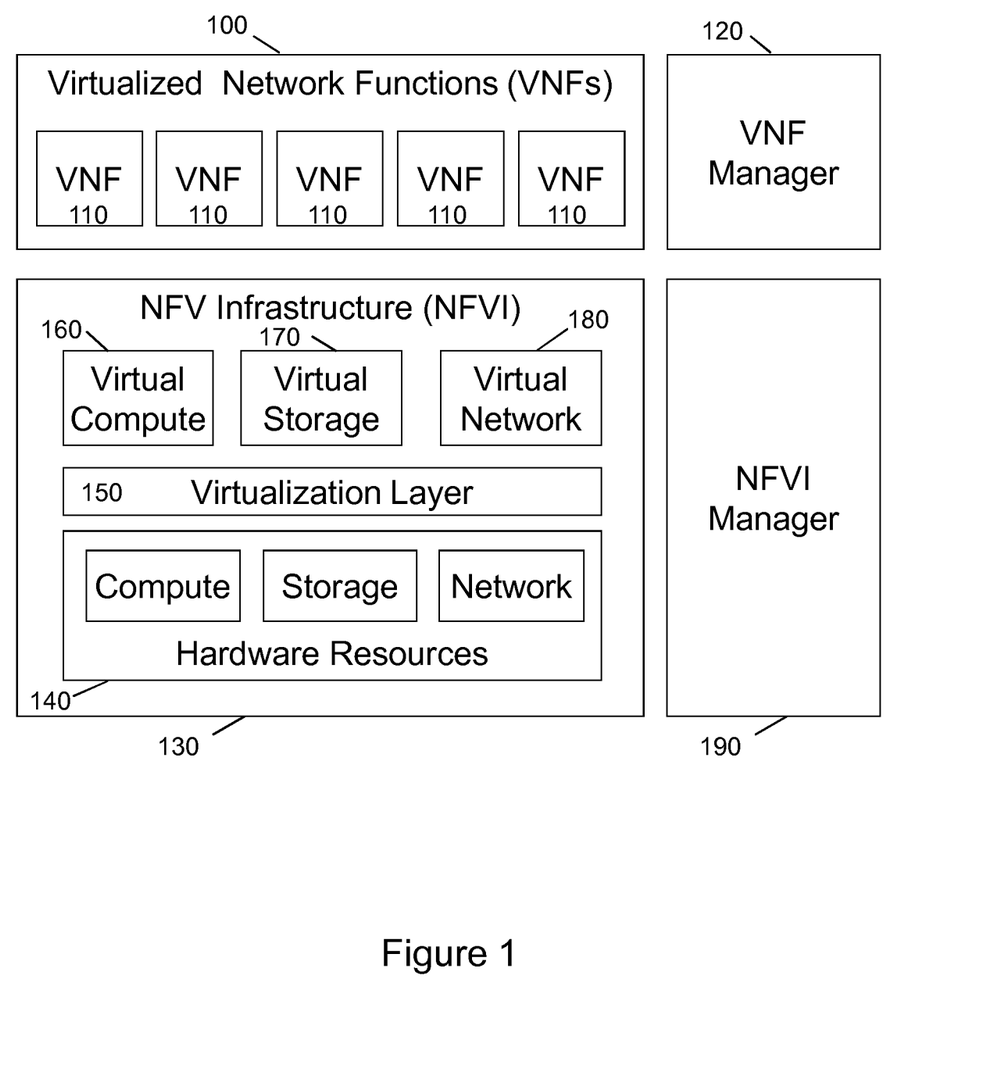
FIG. 1 illustrates a high-level NFV framework defined according to ETSI GS NFV 002 V1.2.1.

The ETSI standardization forum has recognized this trend to virtualize network functions and is standardizing an architectural framework for network function virtualization (NFV), see ETSI GS NFV002 V1.2.1, and FIG. 1. Network Functions Virtualization envisages the implementation of network functions as software-only entities that run on the NFV Infrastructure (NFVI) 130. As such, four main domains are identified in FIG. 1:

- Virtualized Network Functions (VNF) 100, as the software implementation of a network function which is capable of running on the NFVI.
- NFV Infrastructure (NFVI) 130, including the diversity of physical resources and how these can be virtualized. NFVI supports the execution of the VNFs. The NFVI 130 comprises hardware resources 140, which are abstracted by a Virtualization Layer 150. The NFVI 130 offers Virtual Compute 160, Virtual Storage 170, and Virtual Network 180 resources to the VNFs 110 hosted by the NFVI 130.
- NFV Management 120, which covers the orchestration and management of physical and/or software resources (via a NFVI Manager 190), that support the infrastructure virtualization, and the lifecycle management of VNFs. NFV Management focuses on all virtualization-specific management tasks necessary in the NFV framework.
- NFVI Manager 190, which covers the orchestration, management, and lifecycle management of physical and/or software resources that support the infrastructure virtualization.

The NFV framework enables dynamic instantiation and management of VNF instances and the relationships between them regarding data, control, management, dependencies and other attributes.

When combining the concepts of network function virtualization with the concept of using network nodes as platform for hosting such virtualized network functions, the network node platform would be used as NFVI 130 and a VNF Manager 120 would dynamically deploy VNFs 110 onto the NFVI 130.

The network nodes used as a host for VNFs may be the powerful server nodes controlling the communication networks. Since these powerful servers are typically very few and located centrally, there is not much difference over using central data centers. An alternative approach is to utilize those network nodes that are widely geographically distributed and where the sheer number of nodes in the network offers a huge collective processing power. The use of radio access network nodes such as radio base stations (e.g. NodeB, eNodeB, RBS, BTS) are a promising candidate. The prime advantage of utilizing radio base stations would be that the NFV can be located very close to the subscriber, and by that minimize latency and reduce network based transmission bandwidth.

Latency is in particular an issue for specific types of sensors of machine-to-machine (M2M) communication and machine type communication (MTC). In order to keep MTC devices simple and cheap, but also in order to save battery power in autarkic MTC devices, any processing needed for MTC is off-loaded into the network. However, some of the processing off-loaded into the network is time critical, e.g. reaction on certain sensor measurements. For these applications it is critical to have the processing as close as possible to the MTC device.

Consequently, it is unclear how to utilize the NFVI provided by radio base stations in an efficient way.

SUMMARY

There is a clear need for a concept how to utilize radio base stations of a communication network as NFVI. The concept applied here is that all network nodes and application functions that are needed to provide services to a subscriber are virtualized into one or more VNFs. These one or more VNFs are dedicated for exclusive use by a single subscriber. For the provisioning of services typically a number of core network nodes and a number of application servers are utilized for the execution of the services the subscriber is using. The subscriber would be using one or more end-user devices such as a user equipment (UE) (mobile phone or laptop or the like, or even both at the same time) for receiving that services. So the VNFs to be hosted on the NFVI of the radio base station would comprise all components needed for provisioning of the services to the UE used by the subscriber, the set of VNFs would be specific and exclusive to the UE or the group of UEs.

Central service related databases and central subscriber related databases such as the Home Subscriber Server (HSS) would not be covered by the components included in the one or more VNF. These databases would be accessed via a network interface of the radio base station. That network interface may be combined with the network interface of the radio base station used to hook up the radio base station to the access network of the communication network, or may be a separate, dedicated network interface.

A UE is usually not a stationary object but a device that is roaming/moving along with the subscriber. There may be semi-stationary UEs, so moving rarely (nomadic movement), but still the basic assumption applies that UEs are moving around geographically.

It is an object of the present invention to provide a concept how to provide services to a roaming UE, if the VNFs offering such services are hosted on NFVIs of radio base stations.

This object is achieved by the independent claims. Advantageous embodiments are described in the dependent claims.

According to a first aspect of the invention, a method for provisioning of services to a roaming UE is presented. The services are offered by at least one VNF hosted on a source radio base station, and are delivered to the roaming UE via a radio interface of the source radio base station, wherein the roaming UE is roaming from a radio coverage area of the source radio base station into a radio coverage area of a target radio base station. The method comprises to determine a trigger condition for handing-over the delivery of the services from the radio interface of the source radio base station to a radio interface of a target radio base station. The method further comprises to cause, if the trigger condition is met, a VNF manager to deploy at least one VNF on the target radio base station. The at least one VNF on the target radio base station is adapted for offering at least a subset of the provisioned services to the roaming UE.

According to a further aspect of the invention, a method in a VNF manager for provisioning of services to a roaming UE is presented. The services are offered by at least one VNF hosted on a source radio base station, and are delivered to the roaming UE via a radio interface of the source radio base station. The roaming UE is roaming from a radio coverage area of the source radio base station into a radio coverage area of a target radio base station. The method in the VNF manager comprises to receive an indication from a source radio base station for handing-over the delivery of the services from the radio interface of the source radio base station to the radio interface of a target radio base station. The method in the VNF manager further comprises to deploy at least one VNF on the target radio base station. The at least one VNF on the target radio base station is adapted for offering at least a subset of the provisioned services to the roaming UE.

According to a further aspect of the invention, a method in a source radio base station for provisioning of services to a roaming UE is presented. The services are offered by at least one VNF hosted on a source radio base station, and are delivered to the roaming UE via a radio interface of the source radio base station. The roaming UE is roaming from a radio coverage area of the source radio base station into a radio coverage area of a target radio base station. The method in the source radio base station comprises to determine a trigger condition for handing-over the delivery of the services from the radio interface of the source radio base station to a radio interface of a target radio base station. The method in the source radio base station further comprises to cause, if the trigger condition is met, a VNF manager to deploy at least one VNF on the target radio base station. The at least one VNF on the target radio base station is adapted for offering at least a subset of the provisioned services to the roaming UE.

According to a further aspect of the invention, a method in a target radio base station for provisioning of services to a roaming UE is presented. The services are offered by at least one VNF hosted on a source radio base station, and are delivered to the roaming UE via a radio interface of the source radio base station, wherein the roaming UE is roaming from a radio coverage area of the source radio base station into a radio coverage area of a target radio base station. The method in the target radio base station comprises to receive, from a VNF manager, at least one VNF for deployment on the target radio base station. The method in the target radio base station further comprises to deliver the services offered by the least one VNF via a radio interface to the roaming UE.

According to a further aspect of the invention, a VNF manager for provisioning of services to a roaming UE is presented. The services are offered by at least one VNF hosted on a source radio base station, and are delivered to the roaming UE via a radio interface of the source radio base station. The roaming UE is roaming from a radio coverage area of the source radio base station into a radio coverage area of a target radio base station. The VNF manage is capable of receiving an indication from a source radio base station for handing-over the delivery of the services from the radio interface of the source radio base station to the radio interface of a target radio base station. The VNF manage is further capable of deploying at least one VNF on the target radio base station. The at least one VNF on the target radio base station is adapted for offering at least a subset of the provisioned services to the roaming UE.

According to a further aspect of the invention, a radio base station for provisioning of services to a roaming UE is presented. The services are offered by at least one VNF hosted on a radio base station acting as a source radio base station, and are delivered to the roaming UE via a radio interface of the source radio base station. The roaming UE is roaming from a radio coverage area of the source radio base station into a radio coverage area of a radio base station acting as a target radio base station. The radio base station is capable of determining a trigger condition for handing-over the delivery of the services from the radio interface of the source radio base station to a radio interface of a target radio base station. The radio base station is further capable of causing, if the trigger condition is met, a VNF manager to deploy at least one VNF on the target radio base station. The at least one VNF on the target radio base station is adapted for offering at least a subset of the provisioned services to the roaming UE. The radio base station is further capable of receiving, from the VNF manager, at least one VNF for deployment on the target radio base station. The radio base station is also capable of delivering the services offered by the least one VNF via a radio interface to the roaming UE.

According to another aspect of the invention, a system for provisioning of services to a roaming UE is presented. The services are offered by at least one VNF hosted on a source radio base station, and are delivered to the roaming UE via a radio interface of the source radio base station. The roaming UE is roaming from a radio coverage area of the source radio base station into a radio coverage area of a target radio base station. The system comprises a VNF manager, at least two radio base stations acting as source radio base station and target radio base station, and the UE.

Also provided is a computer program product comprising program code portions to perform the steps of any of the methods and method aspects presented herein when the computer program product is executed by one or more processors. The computer program product may be stored on a computer-readable recording medium such as a semiconductor memory, hard-disk or optical disk. Also, the computer program product may be provided for download via a communication network.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

Like reference numbers and designations in the various drawings indicate like elements.

DETAILED DESCRIPTION

In the following, a system, methods, nodes, and computer programs provisioning of services to a roaming UE according to the invention are described in more detail.

Within the context of the present application, the term "service" refers to communication services or application services. A communication service may be a packet transport service such as Internet browsing, file transfer, file download, streaming of audio/video or the like. A communication services may also be voice call, multimedia call, chat, messaging, conference, or the like. Application services may be any service offered by an application or a server such as processing tasks on behalf of UE (such as MTC), gaming, sensor data upload, sensor data analysis, remote control (also as a result of the sensor data analysis), or surveillance tasks, or the like.

Within the context of the present application, the term "user equipment" (UE) refers to a device for instance used by a person for his or her personal communication. It can be a telephone type of device, for example a telephone or a SIP phone, cellular telephone, a mobile station, cordless phone, or a personal digital assistant type of device like laptop, notebook, notepad equipped with a wireless data connection. The UE may also be associated with humans but also with non-humans like animals, plants, or even machines (MTC/M2M). A UE may be equipped with a SIM (Subscriber Identity Module) comprising unique identities such as IMSI (International Mobile Subscriber Identity) and/or TMSI (Temporary Mobile Subscriber Identity) associated with the person using the UE such as a subscriber using the UE. The presence of a SIM within a UE customizes the UE uniquely with a subscription of the subscriber. Such subscriber may also use multiple devices/UEs at the same time.

Within the context of the present application, the term "subscriber" refers to a human being having a service agreement with a service provider such as an operator. The subscriber may also be a legal entity such as a company operating a pool of MTC devices, and these devices operate independent from any human subscriber. In this case the MTC device is the direct receiver of the service while the service subscription is centrally with the company (indirect receiver of such service) operating the pool of MTC devices.

Within the context of the present application, the term "communication network" or short "network" may particularly denote a collection of nodes or entities, related transport links, and associated management needed for running a service, for example a telephony service or a packet transport service. Depending on the service, different node types or entities may be utilized to realize the service. A network operator owns the communication network and offers the implemented services to its subscribers. Typical examples of a communication network are radio access network (such as 2G ($2^{nd}$ Generation), GSM (Global System for Mobile communications), 3G ($3^{rd}$ Generation), WCDMA (Wideband Code Division Multiple Access), CDMA (Code Division Multiple Access), LTE (Long Term Evolution), WLAN (Wireless Local Area Network), Wi-Fi (Wireless Fidelity)), mobile backhaul network, or core network such as IMS (IP Multimedia System), CS (Circuit Switched) Core, PS (Packet Switched) Core.

Within the context of the present application, the term "roaming" refers to a movement of a UE within a coverage area of a communication network. In order to receive services, the UE is registered in a control node being responsible for the geographical area where the UE is currently located and is attached via a radio interface to a radio base station. While moving, the UE may leave the radio coverage area of the current radio cell offered by a current radio base station, the so called source radio base station, and move into a radio cell offered by a further radio base station, the so called target radio base station. This roaming may or may not have implications on the control node where the UE is registered. So if both, source radio base station and target radio base station are under control of the same control node, the registration in the control node is maintained. If source radio base station and target radio base station are under control of different control nodes, also the registration is moved. For a circuit switched services the control nodes are typically MSC (Mobile Services Center) nodes, for packet switched communication services control nodes are typically MME (Mobility Management Entity) nodes for the packet delivery and application servers as provided for example by the IP Multimedia Subsystem, IMS.

Within the context of the present application, the term "control node" refers to a node of the communication network primarily performing control procedures for sessions or calls and services of a subscriber of the communication network. The term typically refers to those entities of the communication network handling control plane, subscriber data, services, or signaling traffic associated with user traffic in the communication network. In a core network a control node may be a MSC, MME (Mobility Management Entity), SGSN (Serving Gateway Support Node), P-CSCF (Proxy Call State Control Function), S-CSCF (Serving-CSCF), or TAS (Telephony Application Server) node.

Within the context of the present application, the term "packet control node" refers to a control node of the packet core network. Examples of packet control node are MME or SGSN.

Within the context of the present application, the term "subscriber database" refers to a database run by the network operator to store the information related to the subscribers of a network run by the operator. A subscriber database can be for example a Home Location Register, HLR, or a Visited Location Register, VLR, or a Home Subscriber Server, HSS, or a combination of HLR and HSS. A subscriber database may also be internally structured into a front end part handling the signaling with the other network nodes of the communication network and a generic database for storage of the data according to data layered architecture principles.

Within the context of the present application, the term radio base station refers to a node of a radio access network that is used as interface between land-based transport links and radio based transport links, wherein the radio based transport link interfaces directly a UE. For example, in a GSM/2G access network a radio base station refers to a BTS, in a WCDMA/3G access network a radio base station refers to a NodeB, and in a LTE access network a radio base station refers to a eNodeB. In a WLAN/Wi-Fi architecture a radio base station refers to an Access Point (AP).

Within the context of the present application, the term "virtual network function (VNF)" may particularly denote a concept taking on the responsibility of handling one or more specific network functions. Such concept may be realized by running that VNF on one or more virtual machines (VMs) on top of a hardware networking infrastructure—e.g. routers, switches, servers, hosting infrastructure, etc. By alternative, the term VNF may also stand for a software container concept that allows running software processes/function in isolation from each other on a common hosting infrastructure. Containers, unlike a virtual machine, do not require or include a separate operating system. Instead, it relies on kernel's functionality and uses resource isolation (CPU, memory, block I/O, network, etc.) and separate namespaces to isolate the application's view of the operating system. Due to the fact that containers do not include an operating system, the size of a container is typically smaller than of an entire virtual machine. Along these lines, the term VNF may also stand for a micro-service concept. The micro-service architectural concept is an approach to develop a function as a suite of smaller functions, each running in its own process and communicating with lightweight mechanisms (e.g. HTTP resource API). These functions are independently deployable by fully automated deployment machinery (e.g. a manager here called VNF Manager).

Individual virtual network functions may also be connected, combined, or chained together as building blocks to offer a full-scale service.

Instead of using multiple individual VNFs and chaining the VNFs together for a full-scale service, it is also possible to merge/combine several of the sub-functions into single VNF. Such VNF would comprise all elements and sub-functions for the provisioning of a service, or even multiple/all services provided to the UE. Typically, such VNF would still server multiple UEs and multiple subscribers.

In an alternative deployment the VNF could comprise all functions for the provisioning of multiple/all services provided to the UE, but the VNF would be dedicated for that single UE or a single subscriber. This concept may be taken a step further, and a VNF could be dedicated for a single service for a single UE. In such scenario, considering that the multiple services are provided to the single UE, several VNFs are involved in provisioning of the services to that UE.

Several permutations are possible for the scenario involving several VNFs per UE:
one VNF per UE and service
one VNF per subscription, so private services provided by one VNF and enterprise services provided by another VNF, in addition there may still be one VNF per service
one VNF per service type or based on specific requirements of the service (e.g. premium class services versus best-effort services)

So there are one or several VNF per UE for provisioning the services to the UE.

In the further description the term "source" radio base station and "target" radio base station are used to distinguish the different roles a radio base station can take. It shall be clear to a technically skilled person to understand that a "target" radio base station can act as a "source" radio base station when the roaming movement of the UE continues. So the UE may also revert its moving direction and by that cause the former "target" radio base station to become a "source" radio base station for the movement back, and the former "source" radio base station becoming a "target" radio base station.

Figure 2:
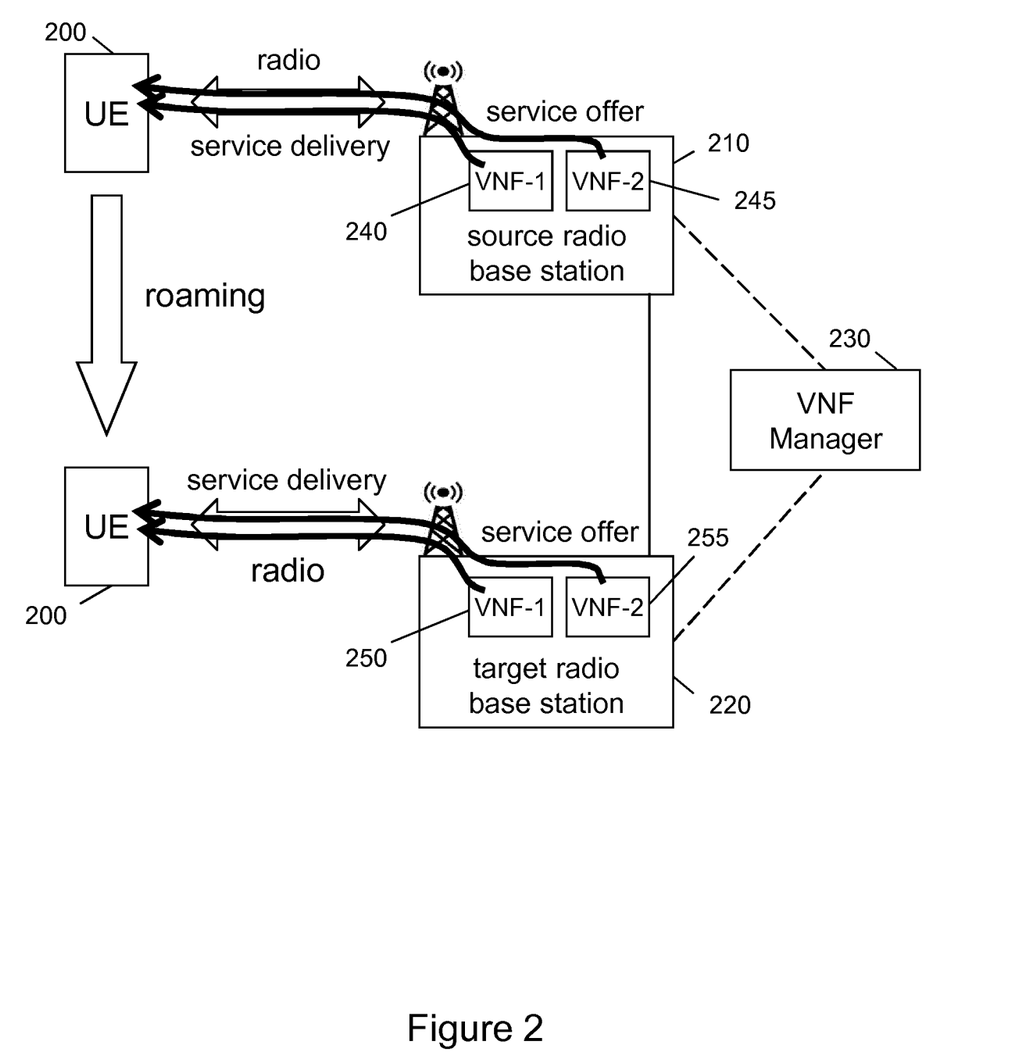
FIG. 2 illustrates a network system for provisioning of services to a roaming UE according to a first embodiment of the invention.

Referring now to FIG. 2, this figure illustrates a network system for provisioning of services to a roaming UE, according to a first embodiment of the invention.

A UE 200 is roaming around and moves from the upper position to the lower position. In the upper position the UE 200 is connected to the source radio base station 210 via a radio interface. In this embodiment the services are offered by VNF-1 240 and VNF-2 245 hosted on the source radio base station 210, and the services are delivered to the roaming UE via a radio interface of the source radio base station 210.

The roaming UE is now roaming from a radio coverage area of the source radio base station 210 into a radio coverage area of a target radio base station 220. So in the lower position the UE 200 is connected to the target radio base station 220 via a radio interface. So in the lower position the services are offered by VNF-1 250 and VNF-2 255 hosted on the target radio base station 220, and the services are delivered to the roaming UE via a radio interface of the source radio base station 220.

So this embodiment shows the case where two VNFs 240, 245 (and VNFs 250, 255 after handing-over the service provisioning) are used to provision services to the roaming UE 200. For example, VNF-1 240 may offer a first set of services, and VNF-2 245 may offer a second set of services. As described above, there may be one of more VNFs per roaming UE.

The movement of the UE 200 causes that at some point of time during the movement, there is a need for handing-over the delivery of the services from the radio interface of the source radio base station 210 to the radio interface of the target radio base station 220. This is done by determining a trigger condition for handing-over the delivery of the services from the radio interface of the source radio base station 210 to the radio interface of the target radio base station 220.

The trigger condition for handing-over may be met if the roaming UE 200 leaves the radio coverage area of the source radio base station 210, so if the radio signal strength of the radio interface of the source radio base station 210 is fading and at the same time the radio signal strength of the radio interface of the target radio base station 220 is found to be on an acceptable level. So this trigger condition may be a radio signal strength threshold, and the trigger condition would be met if the threshold is reached or exceeded/undercut.

If this trigger condition is met, a VNF manager 230 is caused to deploy VNF-1 250 and VNF-2 255 on the target radio base station 220. This causing may be done by the source radio base station 210 by sending an appropriate signaling message to the VNF manager 230 informing him that the condition for handing-over the provisioning of the services has been met.

As an alternative, the source radio base station 210 and target radio base station 220 the may continuously send radio signal strength measurements to the VNF manager 230 and the VNF manager 230 determines when to trigger handing-over the provisioning of the services. The VNF manager 230 may apply a similar radio signal strength threshold as trigger condition.

The VNF-1 250 and VNF-2 255 on the target radio base station 220 are adapted for offering the provisioned services to the roaming UE 200. So after deploying VNF-1 250 and VNF-2 255 on the target radio base station 220, the services are continued to be provisioned to the roaming UE 200. This is done by delivering the services via the radio interface of the target radio base station 220 to the roaming UE 200.

After the handing-over is completed, so after deploying VNF-1 250 and VNF-2 255 on the target radio base station 220, the corresponding VNF-1 240 and VNF-2 245 may be deleted on/removed from the source radio base station 210. This may be initiated by the VNF manager 230 after the handing-over is completed, so for example after reception of a confirmation from the target radio base station 220 that the services are continued to be provisioned to the roaming UE 200. By alternative, this may be triggered by the source radio base station 210 itself, for example after providing a clone copy of VNF-1 240 and VNF-2 245 to the VNF manager 230.

The VNF manager 230 is caused to deploy VNF-1 250 and VNF-2 255 on the target radio base station 220. The VNF manager 230 may do this by deploying a clone of VNF-1 240 and VNF-2 245 hosted on the source radio base station 210 to the target radio base station 220. The VNF manager 230 may request the source radio base station 210 to provide a copy of the VNF-1 240 and VNF-2 245 and forward these to the target radio base station 220 to be deployed as VNF-1 250 and VNF-2 255.

By alternative, so instead of retrieving a copy of the VNF-1 240 and VNF-2 245 from the source radio base station 210, the VNF manager 230 may build VNF-1 250 and VNF-2 255 based on construction information on the provisioned services. That construction information may be retrieved from a database 260 (not shown in FIG. 2) and described in further detail below.

The VNF manager 230 may build VNF-1 250 and VNF-2 255 by retrieving function components from a library 270 comprising function components of a communication network (not shown in FIG. 2) and described in further detail below.

Figure 5:
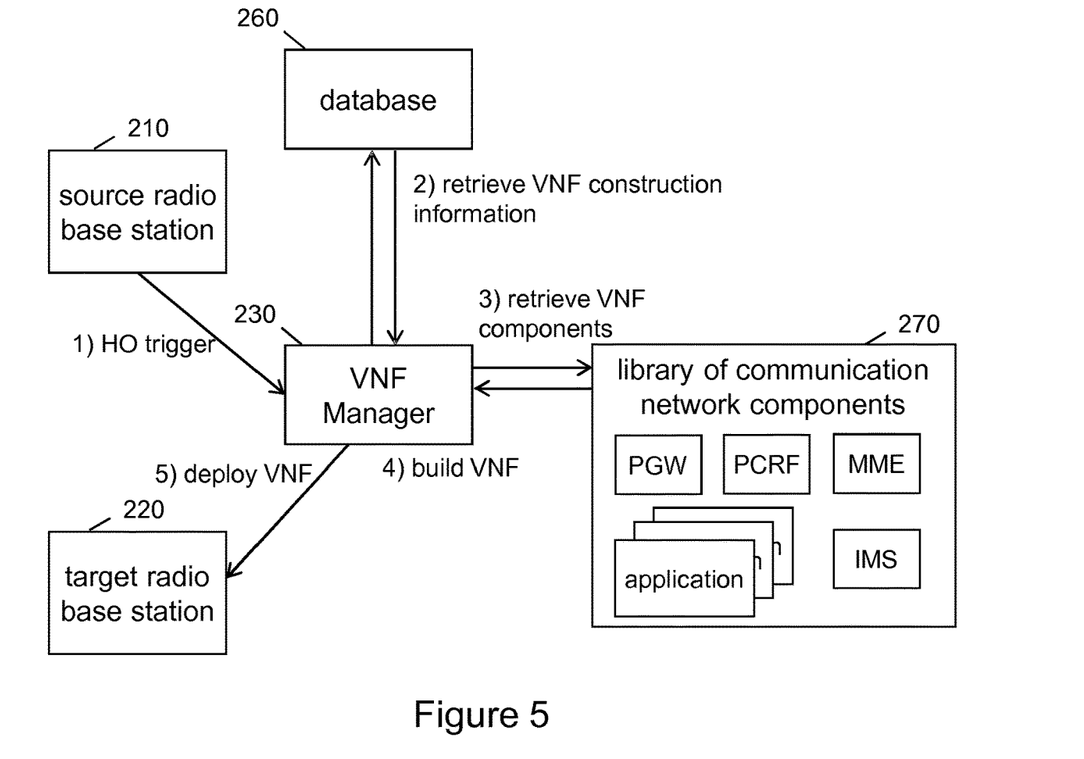
FIG. 5 illustrates a network system for deploying a VNF on the target radio base station according to a second embodiment of the invention.

These two aspects are explained in more detail in FIG. 5.

The UE 200 may continue to roam and the above method is repeated several times. So the VNFs serving the roaming UE 200 are moved along with the roaming movement of the UE 200 and the radio coverage.

It shall be noted that this embodiment shows the scenario where two VNFs are dedicated to the roaming UE 200, and that both of them are handed-over from the source radio base station 210 to the target radio base station 220. So in this case the distribution of the offering of the services over the VNFs 240, 245 is based on for example the services provisioned to the roaming UE 200. By alternative, the services may be distributed base on a subscription profile of a user using the roaming UE 200.

In other embodiments there may be more than two VNFs, or even just a single VNF.

The UE 200 may continue to roam and the above method is repeated.

Figure 3:
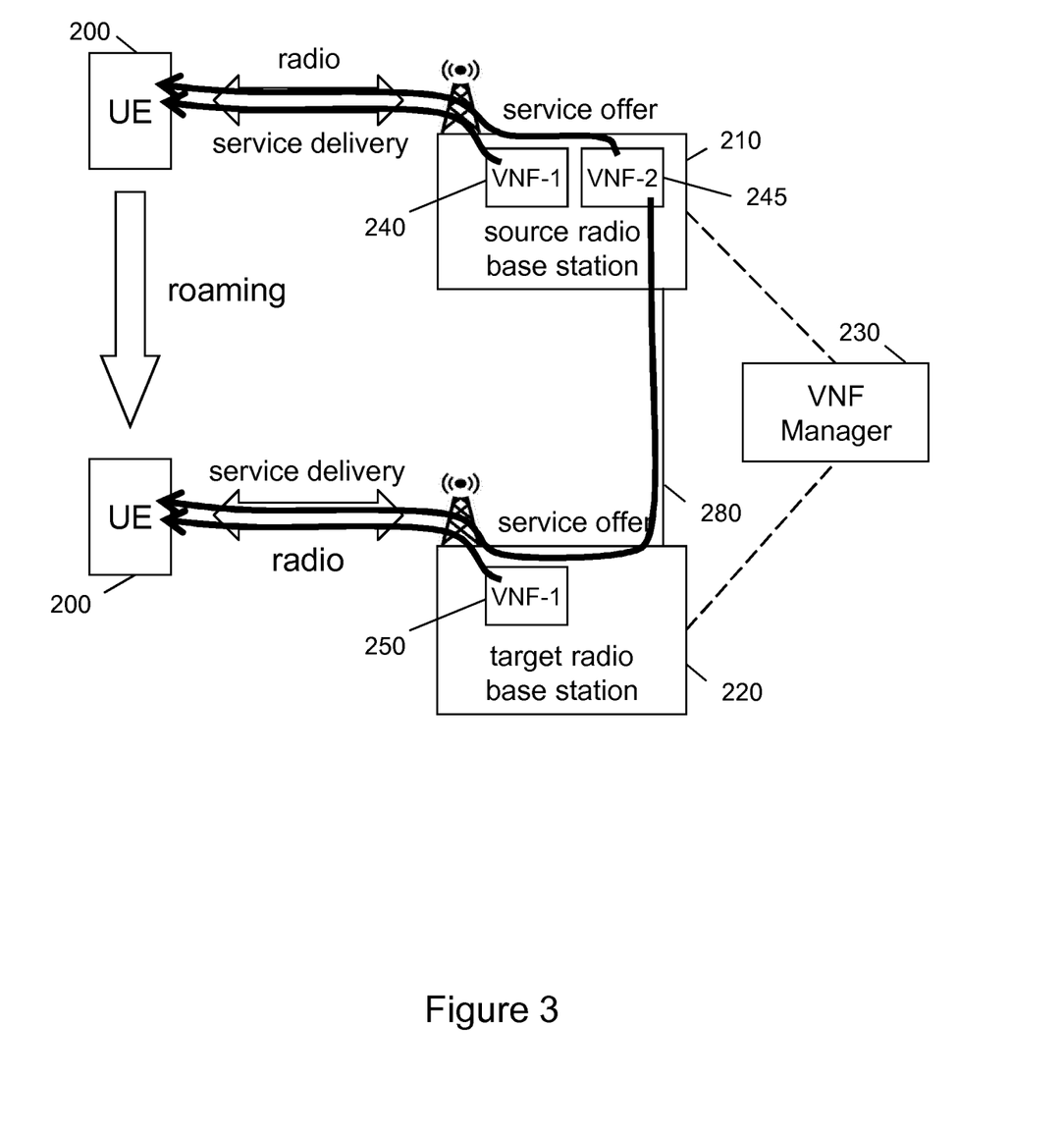
FIG. 3 illustrates a network system for provisioning of services to a roaming UE according to a second embodiment of the invention.

Referring now to FIG. 3, this figure illustrates a network system for provisioning of services to a roaming UE, according to a second embodiment of the invention.

FIG. 3 shows a similar scenario as in FIG. 1. So a UE 200 is roaming around and moves from the upper position to the lower position. In the upper position the UE 200 is connected to the source radio base station 210 via a radio interface. The services are offered by VNF-1 240 and VNF-2 245 hosted on the source radio base station 210 and the services are delivered to the roaming UE via a radio interface of the source radio base station 210.

The roaming UE is now roaming from a radio coverage area of the source radio base station 210 into a radio coverage area of a target radio base station 220. So in the lower position the UE 200 is connected to the target radio base station 220 via a radio interface.

However, in this embodiment, in the lower position the services are offered by VNF-1 250 hosted on the target radio base station 220 and in addition offered by VNF-2 245 still located on the source radio base station 210. The VNF-2 245 is connected via a network interface 280 to the target radio base station 220. The services are then delivered to the roaming UE via a radio interface of the target radio base station 220. The network interface 280 may be a direct land-based connection between the two radio base stations 210, 210. It may also utilize microwave radio based transmission links. Radio base stations are typically hooked up to a backhaul network connecting them to the core network. So such network interface 280 between two radio base stations may also be realized by routing/switching via backhaul network connections or even by routing/switching via a core network node. The network interface 280 may be based on routed packets connections or pre-established packet tunnels using well-known layer 2 or layer 3 tunnel mechanisms.

So in this embodiment, the VNF manager 230 is handing-over a subset of the services from the source radio base station 210 to the target radio base station 220. The remaining (not handed-over) services are continued to be offered by the VNF-2 245 in the source radio base station 210 and are delivered to the roaming UE 200 via the radio interface of the target radio base station 220.

The VNF manager 230 decides the service subset to be handed-over based on the service provisioned to the roaming UE 200, or the subscription profile of the user using the roaming UE 200.

In this scenario the VNF manager 230 deploys just VNF-1 250 on the target radio base station 220. VNF-1 250 may be a clone copy of VNF-1 240 from the source radio base station 210, or may be newly build by the VNF manager 230 as described in FIG. 5 below.

It shall be noted that this embodiment shows the scenario where two VNFs are dedicated to the roaming UE 200, and that one of them is handed-over from the source radio base station 210 to the target radio base station 220. So in this case the distribution of the offering of the services over the VNFs 240, 245 may also be based on the services provisioned to the roaming UE 200 or on a subscription profile of a user using the roaming UE 200.

In other embodiments there may be more than two VNFs, for example five VNFs, and two of them are handed-over to the target radio base station 220, while three of them remain on the source radio base station 210. Various other combinations of number of handed-over VNFs and VNFs remaining can be thought of, if determined useful for the provisioned services or subscription profile by the VNF manager 230.

For example, services that have very demanding latency requirements may be handed-over to the target radio base station 220, while others having less stringent latency requirements may be left at the source radio base station 210 and are delivered via network interface 280.

The UE 200 may continue to roam and the above method is repeated. So the VNFs remaining on the source radio base station 210 stay even further on that source radio base station 210, while the handed-over VNFs are handed-over again to a next target radio base station 220, and so on.

Optionally, at each trigger condition for handing-over VNFs, the VNF manager 230 may take another decision whether to hand-over the VNF in the source radio base station 210. So if, after the UE having moved for a longer distance, or if the service delivery via the network interface 280 from the source radio base station 210 to the next target radio base station 220 experiences an increased latency (for example if transported over slow speed connections or delay intensive microwave links), the VNF manager 230 may decide to commonly hand-over VNFs from the source radio base station 210 and from a previous target radio base station 220 to a new target radio base station 220. In this scenario all VNFs offering services to the UE 200 would be gathered at the new target radio base station 220 and we are again in the starting situation as depicted in FIG. 2 and FIG. 3.

Figure 4:
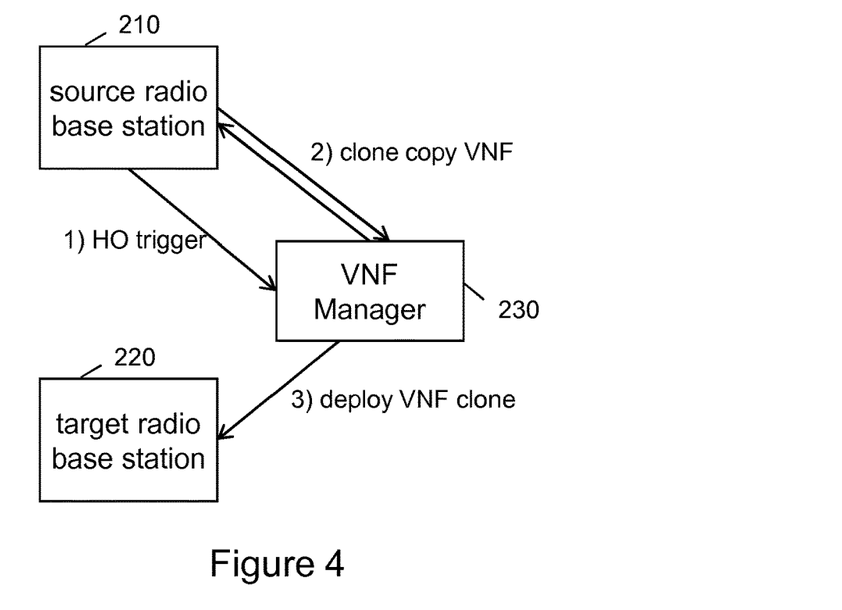
FIG. 4 illustrates a network system for deploying a VNF on the target radio base station according to a first embodiment of the invention.

Referring now to FIG. 4, this figure illustrates a network system for deploying a VNF on the target radio base station, according to a first embodiment of the invention.

In this embodiment the cloning of a VNF from a source radio base station 210 to a target radio base station 220 is illustrated in more detail.

The cloning may be triggered by an indication received by the VNF Manager 230 from the source radio base station 210 that a handing-over of the delivery of the services from the radio interface of the source radio base station 210 to the radio interface of a target radio base station 220 is needed. This trigger may for example be based on the UE 200 leaving the radio coverage area of the source radio base station 210. By alternative, this first step may also be triggered by the target radio base station 220, for example when a UE 200 enters the radio coverage area of the target radio base station 220.

After having determined which of the VNFs to hand-over, the VNF Manager 230 may in a second step request a clone copy of the one or more determined VNFs from the source radio base station 210. The source radio base station 210, receiving such request, may produce a clone copy by taking a current snapshot of the requested, running VNF, in order to capture the current dynamic state of the VNF. Then the source radio base station 210 returns that clone copy to the VNF Manager 230. The VNF Manager 230 may request more than one clone copy; in this case the source radio base station 210 may provide this plurality of clone copies in a single response, or in several responses or sub-responses (segmented response). By alternative, the VNF Manager 230 may request one VNF at a time, however, this would prolong the handing-over time.

The VNF Manager 230 may also request clone copies of one or more VNFs from several source radio base station 210, in case of continued roaming of the UE and previous partial handing-over of VNFs as described above.

In a third step the VNF Manager 230 deploys the one or more VNFs on the target radio base station 220. The one or more VNFs on the target radio base station 220 are adapted for offering at least a subset of the provisioned services to the roaming UE 200.

Referring now to FIG. 5, this figure illustrates a network system for deploying a VNF on the target radio base station, according to a second embodiment of the invention.

In this embodiment the building of a VNF by the VNF Manager 230 is illustrated in more detail.

In a first step VNF building may be triggered by an indication received by the VNF Manager 230 from the source radio base station 210 that a handing-over of the delivery of the services from the radio interface of the source radio base station 210 to the radio interface of a target radio base station 220 is needed. This trigger may for example be based on the UE 200 leaving the radio coverage area of the source radio base station 210. By alternative, this first step may also be triggered by the target radio base station 220, for example when a UE 200 enters the radio coverage area of the target radio base station 220.

In this embodiment the VNFs to be deployed on the target radio base station 220 is not a clone copy of a VNF in the source radio base station 210 but a newly built VNF. The VNF Manager 230 may decide to use the clone copy method or the method to build the VNFs anew. The VNF Manager 230 may use different decision criteria such as number of provisioned services, complexity of the provisioned services, size of the resulting VNF and the like. The VNF Manager 230 may also check the capabilities/type of NFVI provided by the target radio base station 220. So the NFVI provided by the target radio base station 220 may require a different building of the VNF than used on the source radio base station 210, so that a VNF clone copy of source radio base station 210 would not be compatible with the target radio base station 220.

So in the second step, the VNF Manager 230 has to determine the components that the VNF shall comprise, that are all components required for offering the provisioned services to the UE 200. In order to do this, the VNF Manager 230 may query a database. This database may be an Operation Support System, OSS, or a Business Support System, BSS, or a Network Management System, NMS. Such database may be located still within the communication network.

So the VNF Manager 230 has to determine the services that the subscriber has subscribed to and that he is currently using. As a result the VNF Manager 230 receives construction information on how to build the needed (one or more) VNF(s). Based on this construction information, the VNF Manager 230 may in a third step retrieve the required software components from a library comprising communication network components.

So for example, the VNF construction information may demand that a Packet Gateway, PGW, a Mobility Management Entity, MME, a Policy and Charging Rules Function, PCRF, application-1, application-2, and application-3 would be required. The VNF Manager 230 then retrieves these software components from the library.

In a fourth step the VNF Manager 230 builds the VNF based on the construction information, the software components from the library, and particular building method required for the NFVI provided by the target radio base station 220. The readily built VNF is then in a fifth step deployed on the target radio base station 220.

These steps may be repeated if more than one VNF needs to be deployed, or these steps may be performed in parallel in order to build and deploy multiple VNFs. The one or more VNFs on the target radio base station 220 are adapted for offering at least a subset of the provisioned services to the roaming UE 200.

Figure 6:
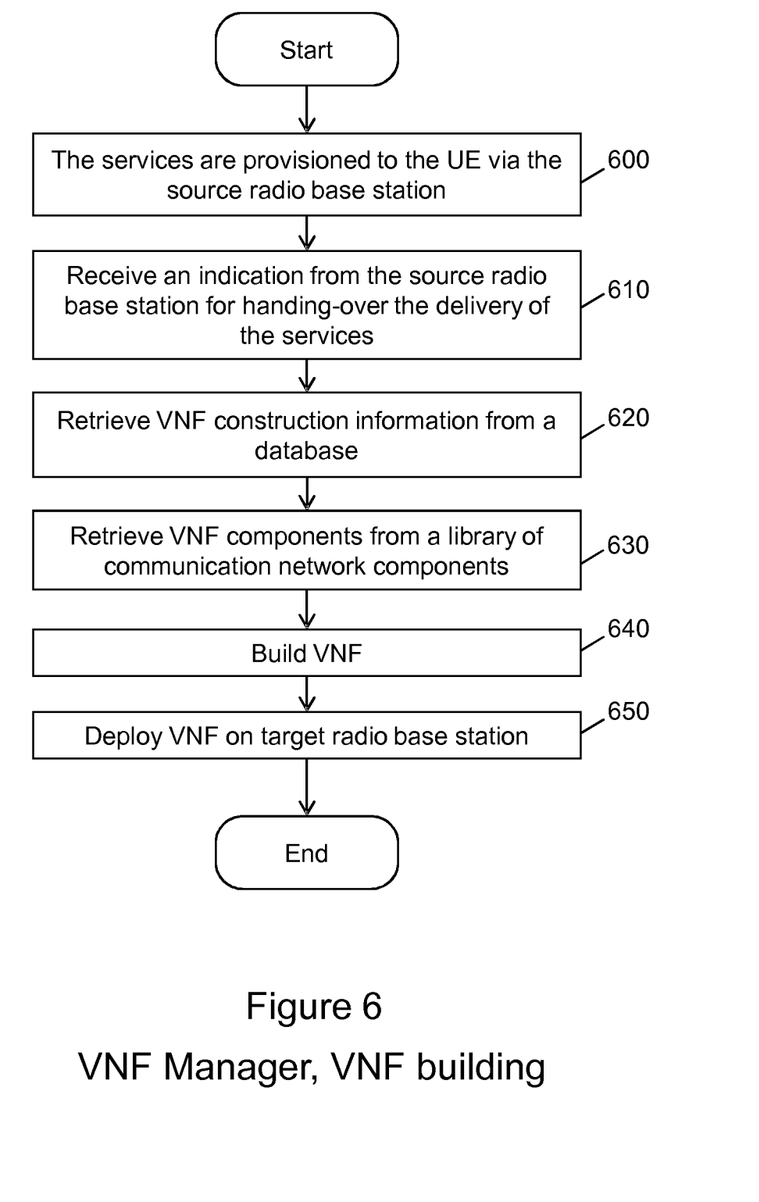
FIG. 6 illustrates a flow diagram of a method embodiment in a VNF Manager for building a VNF according to the invention.

Referring now to FIG. 6, this figure illustrates a flow diagram of a method embodiment in a VNF Manager 230 for building a VNF, according to the invention.

This flow diagram illustrates the steps for building one or more VNF corresponding to FIG. 5. The flow starts in step 600 where services are provisioned to the roaming UE 200 via the source radio base station 220.

In step 610 the VNF Manager 230 receives an indication from the source radio base station 220 for handing-over the delivery of the services. The VNF Manager 230 decides whether to retrieve a clone copy of the VNFs from the source radio base station 220, or whether to build new VNFs. In this embodiment, the VNF Manager 230 decides to build new VNFs.

In step 620 the VNF Manager 230 retrieves VNF construction information from a database.

Based on this VNF construction information the VNF Manager 230 retrieves in step 630 VNF components from a library of communication network components.

In step 640 the VNF Manager 230 builds the VNF based on the construction information using the components retrieved from the library. The VNF Manager 230 also initializes the built VNF.

In step 650 the VNF Manager 230 deploys the built VNF on the target radio base station 220.

These steps may be repeated if more than one VNF needs to be deployed, or these steps may be performed in parallel for more than one VNF to be deployed.

The one or more VNFs on the target radio base station 220 are adapted for offering at least a subset of the provisioned services to the roaming UE 200.

Figure 7:
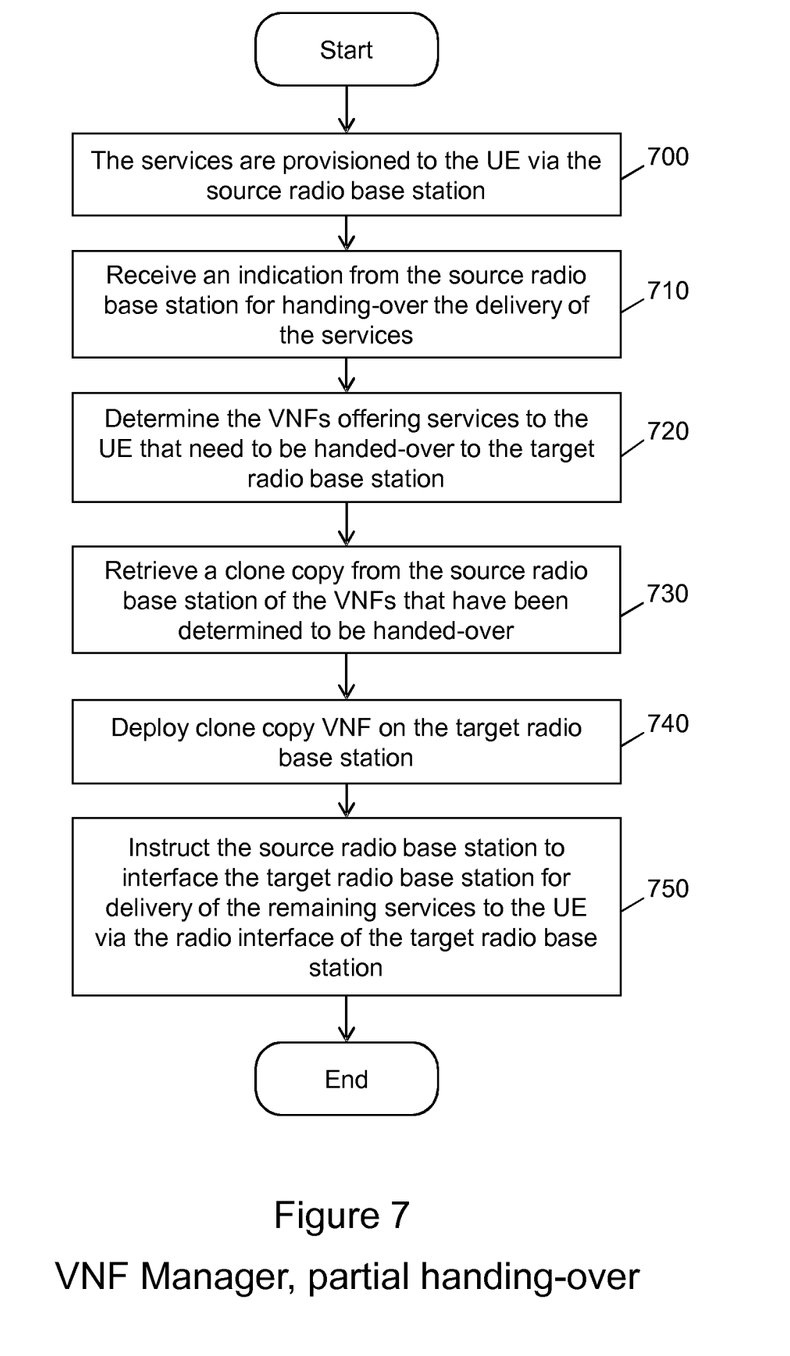
FIG. 7 illustrates a flow diagram of a method embodiment in a VNF Manager for provisioning of services to a roaming UE according to the invention.

Referring now to FIG. 7, this figure illustrates a flow diagram of a method embodiment in a VNF Manager 230 for provisioning of services to a roaming UE according to the invention. This flow corresponds to the network scenario as shown in FIG. 3.

The flow starts in step 700 where the services are provisioned to the roaming UE 200 via the source radio base station 210.

In step 710 the VNF Manager 230 receives an indication from the source radio base station 220 for handing-over the delivery of the services.

In this particular embodiment a subset of the services is handed-over from the source radio base station 210 to the target radio base station 220. The remaining services are continued to be offered by the VNFs in the source radio base station 210 and are delivered to the roaming UE 200 via the radio interface of the target radio base station 220.

So in step 720 the VNF Manager 230 determines the VNFs that need to be handed-over to the target radio base station 220. The VNF Manager 230 may perform this determination based on the services that the VNF is offering to the UE 200. So services that have very demanding latency requirements may be handed-over to the target radio base station 220, while others having less stringent latency requirements may be left at the source radio base station 210 and are delivered via network interface 280.

After having decided which of the VNFs in the source radio base station 210 need to be handed-over to the target radio base station 220, in step 730 the VNF Manager 230 may retrieve a clone copy from the source radio base station 210 of the VNFs that have been determined to be handed-over. Instead of retrieving a clone copy, the VNF Manager 230 may also build a new VNF as described in FIGS. 5 and 6.

In step 740 the VNF Manager 230 deploys the VNF on the target radio base station 220.

Finally in step 750 the VNF Manager 230 instructs the source radio base station 210 to interface the target radio base station 220 for delivery of the remaining services to the UE 200 via the network interface 280 to the target radio base station.

The one or more VNFs on the target radio base station 220 and the remaining one or more VNFs on the source radio base station 210, together are adapted for offering the provisioned services to the roaming UE 200.

Figure 8:
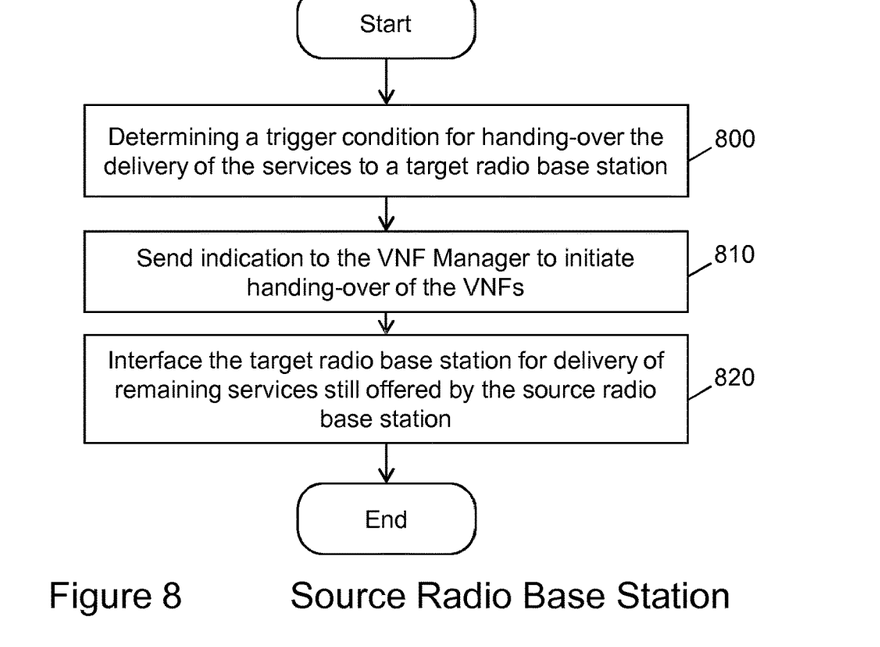
FIG. 8 illustrates a flow diagram of a method embodiment in a source radio base station for provisioning of services to a roaming UE according to the invention.

Referring now to FIG. 8, this figure illustrates a flow diagram of a method embodiment in a source radio base station 210 for provisioning of services to a roaming UE, according to the invention.

The flow starts in step 800 when the source radio base station 210 determines a trigger condition for handing-over the delivery of the services to a target radio base station 220.

In step 810 the source radio base station 210 sends an indication to the VNF Manager 230 to initiate handing-over of the one or more VNFs.

This embodiment assumed the situation that the VNF Manager 230 builds new VNFs. In this case the source radio base station 210 will not receive any request for providing a clone copy of the VNFs on the source radio base station 210.

In step 820 the source radio base station 210 receive an instruction from the VNF Manager 230 to interface the target radio base station 220 for delivery of remaining services still offered by VNFs on the source radio base station 210. That interface may be the interface 280.

Note that the last step 820 may be optional and is used when the VNF Manager 230 determines to hand-over a subset of the VNFs from the source radio base station 210 to the target radio base station 220.

Figure 9:
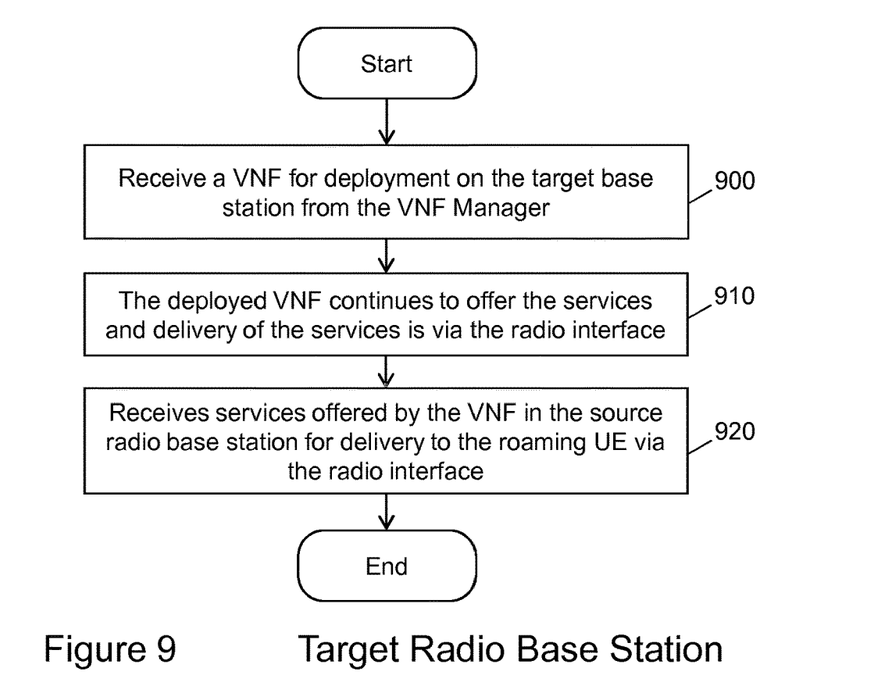
FIG. 9 illustrates a flow diagram of a method embodiment in a target radio base station for provisioning of services to a roaming UE according to the invention.

Referring now to FIG. 9, this figure illustrates a flow diagram of a method embodiment in a target radio base station 220 for provisioning of services to a roaming UE, according to the invention.

The flow starts in step 900 when the target radio base station 220 receives at least one VNF for deployment on the target base station 220 from the VNF Manager 230. The target radio base station 220 then deploys the received VNFs, initializes and starts them.

In step 910 the deployed VNF continues to offer the provisioned services and delivery of the services is via the radio interface of the target radio base station 220 to the UE 200.

In addition, the target base station 220 may in step 920 receive services via the network interface 280. These received services are offered by remaining VNFs in the source radio base station 210 and are delivery to the roaming UE 200 via the radio interface of the target radio base station 220. This last step is optional and is used when the VNF Manager 230 determines to hand-over a subset of the VNFs from the source radio base station 210 to the target radio base station 220.

Figure 10:
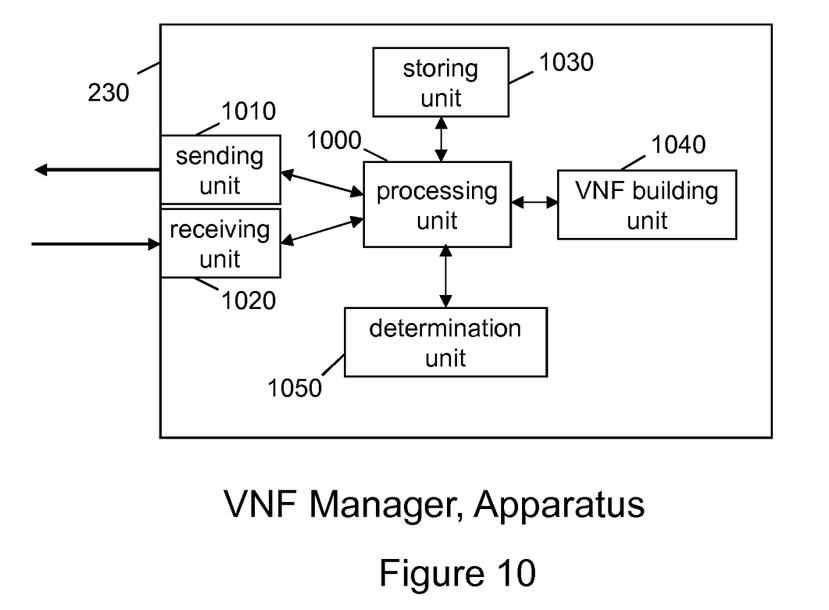
FIG. 10 illustrates a schematic block diagram of a VNF Manager apparatus embodiment for provisioning of services to a roaming UE according to the invention.

Referring now to FIG. 10, this figure illustrates a schematic block diagram of a VNF Manager apparatus embodiment for provisioning of services to a roaming UE, according to the invention. The VNF Manager apparatus may be adapted to perform method steps according to the method illustrated in FIG. 6 or 7.

The VNF Manager 230 may comprise a number of functional units, which are described in further detail below and which are adapted to perform respective method steps.

A processing unit 1000 of the VNF Manager 230 may be adapted to execute steps for provisioning of services to a roaming UE. The processing unit 1000 handles reception of an indication from a source radio base station 210 for handing-over the delivery of the services from the radio interface of the source radio base station 210 to the radio interface of a target radio base station 220. The processing unit 1000 also handles deployment of at least one VNF on the target radio base station 220.

In a practical implementation the processing unit 1000 may be one processor taking care of all the above functions, or may also be distributed over more than one processor, wherein the functions are distributed over the available processors. The VNF manager 230 may be a VNF itself, e.g. instantiated by a master VNF manager running on the same or a further NFVI.

The VNF manager 230 may further comprise a sending unit 1010 and a receiving unit 1020 via which the VNF manager 230 can communicate with other physical entities or external VNFs such as the source radio base station 210, the target radio base station 220, or VNFs deployed thereon. The sending unit 1010 may send out signaling messages composed by the processing unit 1000. The receiving unit 1020 may receive signaling messages from those external entities above and forward the received signaling messages to the processing unit 1000 for decoding and/or dispatching. The VNF manager 230 may further comprise a network interface to a database 260 for retrieval of construction information for building a VNF, or to a library 270 comprising function components of a communication network for building a VNF. The receiving unit 1020 may retrieve a clone copy of a VNF from a source radio base station 210, and the sending unit 1010 may send the clone copy of the VNF to the target radio base station 220 for deployment. The sending unit 1010 may also send a VNF to the target radio base station 220, which has been built by the VNF building unit 1040.

The VNF manager 230 may also comprise a storing unit 1030 for storing information related to provisioning of services to a roaming UE. The storing unit 1030 may keep a cache of frequently used VNFs, or a VNF skeleton/framework which can be tailored to specific task/service provisioning by adding configuration or by proper initialization. The storing unit 1030 may be a pure software functional module such as a SQL database software module. The storing unit 1030 may also have access to and/or use a centralized storage (e.g. a Network Attached Storage, NAS) comprising various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 1030 may be used by the processing unit 1000 to store information, for example program code or data related to VNF manager 230 tasks. The storing unit 1030 may also host a database of construction information 260 and/or a library of communication network components 270.

The VNF manager 230 may further comprise a VNF building unit 1040. This VNF building unit 1040 may retrieve VNF construction information for building a VNF, retrieve either externally, or internally if hosted by the storing unit 1030. Based on this VNF construction information the VNF building unit 1040 may retrieve the required software components from a library 270 comprising function components of a communication network for building a VNF. Also this library 270 may be hosted by the storing unit 1030. The VNF building unit 1040 may then build a VNF and initialize that VNF for deployment. The VNF is then deployed to the target radio base station 220 via the sending unit 1010.

The VNF manager 230 may also comprise a determination unit 1050. This determination unit 1050 is used to determining a trigger condition for handing-over the delivery of the services from the radio interface of the source radio base station 210 to a radio interface of a target radio base station 220. The trigger condition for handing-over may be met if the roaming UE 200 leaves the radio coverage area of the source radio base station 210, so if the radio signal strength of the radio interface of the source radio base station 210 is fading and at the same time the radio signal strength of the radio interface of the target radio base station 220 is found to be on an acceptable level.

Figure 11:
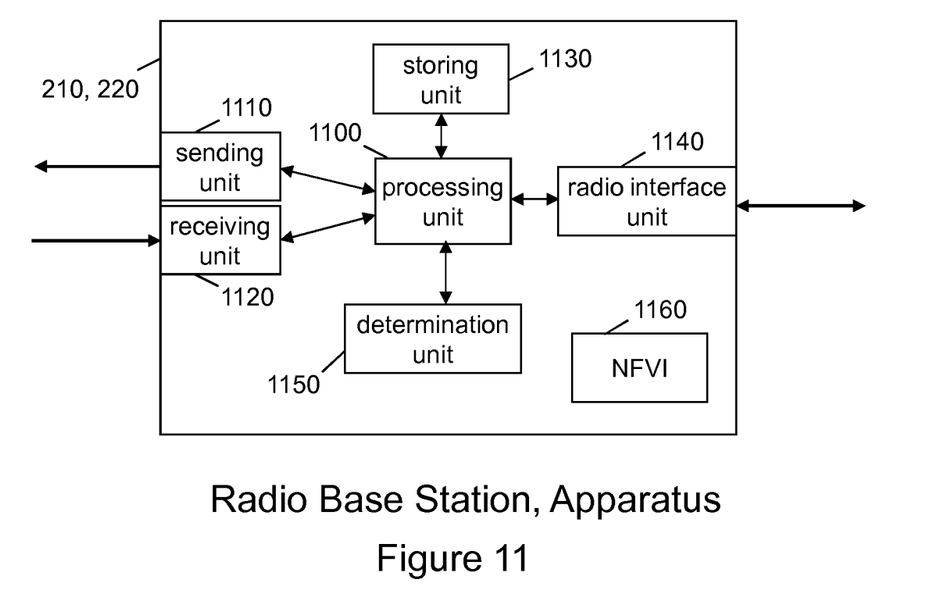
FIG. 11 illustrates a schematic block diagram of a radio base station apparatus embodiment for provisioning of services to a roaming UE according to the invention.

Referring now to FIG. 11, this figure illustrates a schematic block diagram of a radio base station apparatus embodiment for provisioning of services to a roaming UE, according to the invention. The radio base station may be adapted to perform method steps according to the method of FIG. 8 or 9. So the radio base station is adapted to act as a source radio base station 210 and as a target radio base station 220, at the same time for different UEs, and at different times for the same UE.

The radio base station 210, 220 may comprise a number of functional units, which are described in further detail below and which are adapted to perform respective method steps.

A processing unit 1100 of the radio base station 210, 220 may be adapted to execute steps for provisioning of services to a roaming UE according. The processing unit 1100 causes, if a trigger condition is met, a VNF manager 230 to deploy at least one VNF 250, 255 on a target radio base station 220. The processing unit 1100 may also deploy a received VNF on its NFVI 1160. In a practical implementation the processing unit 1100 may be one processor taking care of all the above functions, or may also be distributed over more than one processor, wherein the functions are distributed over the available processors.

The radio base station 210, 220 may further comprise a sending unit 1110 and a receiving unit 1120 via which the radio base station 210, 220 can communicate with other physical entities or external VNFs such as the VNF manager 230 or a further radio base station 210, 220. The sending unit 1110 may send out signaling messages composed by the processing unit 1100. The receiving unit 1120 may receive signaling messages from those external entities above and forward the received signaling messages to the processing unit 1100 for decoding and/or dispatching. When working as a source radio base station 210, the radio base station 210, 220 may further comprise a network interface 280 to a target radio base station 220 for delivery of services offered by local VNFs for delivery via a radio interface of the further radio base station 210, 220 to the UE 200. When working as a target radio base station 220, the radio base station 210, 220 may use that same network interface 280 for receiving services from a source radio base station 210 for delivery to the UE 200 via the radio interface unit 1140. That network interface may be a separate unit or combined with that sending unit 1110 and a receiving unit 1120. The receiving unit 1120 may receive for deployment on the NFVI 1160 one or more VNF. Such VNF may be a clone copy of a VNF from a source radio base station 210, or a VNF built by a VNF manager 230.

The radio base station 210, 220 may also comprise a storing unit 1130 for storing information related to provisioning of services to a roaming UE. The storing unit 1130 may be a pure software functional module such as a SQL database software module. The storing unit 1030 may also have access to and/or use a centralized storage (e.g. a Network Attached Storage, NAS) comprising various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 1130 may be used by the processing unit 1100 to store information, for example program code or data related to radio base station 210, 220 tasks.

The radio base station 210, 220 may further comprise a radio interface unit 1140 comprising a sending a receiving part. The radio interface unit 1140 is utilized for radio communication with the UE 200. So the radio interface unit 1140 may send messages and data related to the provisioned services to the UE 200 and receive messages and data related to the provisioned services from the UE 200. The services may be offered by VNFs locally in the radio base station 210, 220, or are received via a network interface 280 from a further radio base station 210, 220, hosting VNFs that have not been handed-over.

The radio base station 210, 220 may also comprise a determination unit 1150. The determination unit 1150 determines a trigger condition for handing-over the delivery of the services from the radio interface of the source radio base station 210 to a radio interface of a target radio base station 220. The trigger condition for handing-over may be met if the roaming UE 200 leaves the radio coverage area of the source radio base station 210, so if the radio signal strength of the UE 200 is fading. The radio signal strength may be determined with the help of the radio interface unit 1140 for example by taking own measurements, or by measurements reported from a UE 200.

The radio base station 210, 220 may further comprise a NFVI 1160. The NFVI 1160 is adapted to host VNFs such as VNFs for offering of services to a roaming UE 200. The NFVI 1160 comprises hardware resources, which are abstracted by a Virtualization Layer. VNFs received from a VNF manager 230 may be deployed on the NFVI 1160.

According to another embodiment, a computer program is provided. The computer program may be executed by the processing units 1000 and/or 1100 of the above mentioned entities 210, 220 and/or 230 respectively such that a method for provisioning of services to a roaming UE as described above with reference to FIGS. 6 to 9 may be carried out or be controlled. In particular, the entities 210, 220 and/or 230 respectively may be caused to operate in accordance with the above described method by executing the computer program.

The computer program may be embodied as computer code, for example of a computer program product. The computer program product may be stored on a computer readable medium, for example a disk or the storing unit 1030 and/or 1130 of the entities 210, 220 and/or 230 respectively, or may be configured as downloadable information.

One or more embodiments as described above may enable at least one of the following technical effects:

Continuously provisioning of services to a UE while roaming reduce service latency and network transmission bandwidth due to processing close to the UE location selectively exclude VNFs from being handed-over, deliver the related services to the UE via the radio interface of the target base station flexibility of VNF allocation: per subscription, per UE, or per service improving network flexibility, so to make it possible to allocate less-important VNFs to hosts across the network that have spare resources Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for provisioning of services, to a roaming User Equipment (UE), the services being offered by at least one Virtual Network Function (VNF) hosted on a source radio base station, and being delivered to the roaming UE via a radio interface of the source radio base station, wherein the roaming UE is roaming from a radio coverage area of the source radio base station into a radio coverage area of a target radio base station, the method comprising:

determining a trigger condition for handing-over the delivery of the services from the radio interface of the source radio base station to a radio interface of the target radio base station; and causing, if the trigger condition is met, a VNF manager to deploy at least one VNF on the target radio base station, the at least one VNF on the target radio base station being adapted for offering at least a subset of the services to the roaming UE;

wherein the VNF manager is handing-over the subset of the services from the source radio base station to the target radio base station;

wherein a remainder of the services are continued to be offered by the VNFs on the source radio base station and are delivered to the roaming UE via the radio interface of the target radio base station.

2. The method of claim 1, further comprising continuing, after deploying the at least one VNF on the target radio base station, to provision the services to the roaming UE.

3. The method of claim 1, further comprising delivering, after deploying the at least one VNF on the target radio base station, the services via the radio interface of the target radio base station to the roaming UE.

4. The method of claim 1, further comprising deleting, after deploying the at least one VNF on the target radio base station, the at least one VNF on the source radio base station.

5. The method of claim 1, wherein the trigger condition for handing-over is met if the roaming UE leaves the radio coverage area of the source radio base station.

6. The method of claim 1, wherein the at least one VNF hosted on the target radio base station is a clone of the at least one VNF hosted on the source radio base station.

7. The method of claim 1, wherein the at least one VNF hosted on the target radio base station is built by the VNF manager based on construction information on the provisioned services, the construction information being retrieved from a database.

8. The method of claim 1, wherein, if there is more than one VNF hosted on the source radio base station, the offering of the services is distributed over the VNFs.

9. The method of claim 8, wherein the distribution of the offering of the services over the VNFs is based on at least one of: the services provisioned to the roaming UE, and a subscription profile of a user using the roaming UE.

10. A method, in a Virtual Network Function (VNF) manager, for provisioning of services to a roaming User Equipment (UE), the services being offered by at least one VNF hosted on a source radio base station, and being delivered to the roaming UE via a radio interface of the source radio base station, wherein the roaming UE is roaming from a radio coverage area of the source radio base station into a radio coverage area of a target radio base station, the method comprising:
  receiving an indication from a source radio base station for handing-over the delivery of the services from the radio interface of the source radio base station to the radio interface of the target radio base station; and
  deploying at least one VNF on the target radio base station, the at least one VNF on the target radio base station being adapted for offering at least a subset of the provisioned services to the roaming UE;
  handing-over the subset of the services from the source radio base station to the target radio base station;
  wherein a remainder of the services are continued to be offered by the VNFs on the source radio base station and are delivered to the roaming UE via the radio interface of the target radio base station.

11. The method of claim 10, further comprising causing, after deploying the at least one VNF on the target radio base station, the continued provisioning of the services to the roaming UE.

12. The method of claim 10, further comprising causing, after deploying the at least one VNF on the target radio base station, delivery of the services via the radio interface of the target radio base station to the roaming UE.

13. The method of claim 10, further comprising deleting, after deploying the at least one VNF on the target radio base station, the at least one VNF on the source radio base station.

14. A method, in a source radio base station, for provisioning of services to a roaming User Equipment (UE), the services being offered by at least one Virtual Network Function (VNF) hosted on the source radio base station, and being delivered to the roaming UE via a radio interface of the source radio base station, wherein the roaming UE is roaming from a radio coverage area of the source radio base station into a radio coverage area of a target radio base station, the method comprising:
  determining a trigger condition for handing-over the delivery of the services from the radio interface of the source radio base station to a radio interface of the target radio base station; and
  causing, if the trigger condition is met, a VNF manager to deploy at least one VNF on the target radio base station, the at least one VNF on the target radio base station being adapted for offering at least a subset of the services to the roaming UE;
  wherein the VNF manager is handing-over the subset of the services from the source radio base station to the target radio base station;
  wherein a remainder of the services are continued to be offered by the VNFs on the source radio base station, and the remainder of the services are routed to the target radio base station for delivery to the roaming UE.

15. The method of claim 14, further comprising deleting, in response to instruction from the VNF manager, the at least one VNF on the source radio base station.

16. The method of claim 14, wherein the trigger condition for handing-over is met if the roaming UE leaves the radio coverage area of the source radio base station.

17. A method, in a target radio base station, for provisioning of services to a roaming User Equipment (UE), the services being offered by at least one Virtual Network Function (VNF) hosted on a source radio base station, and being delivered to the roaming UE via a radio interface of the source radio base station, wherein the roaming UE is roaming from a radio coverage area of the source radio base station into a radio coverage area of the target radio base station, the method comprising:
  receiving, from a VNF manager, at least one VNF for deployment on the target radio base station, wherein the VNF manager is handing-over a subset of the services from the source radio base station to the target radio base station, and a remainder of the services are continued to be offered by the VNFs on the source radio base station and are routed to the target radio base station; and
  receiving the remainder of the services for delivery to the roaming UE via a radio interface of the target base station;
  delivering the remainder of the services routed to the target radio base station to the roaming UE via the radio interface of the target base station;
  delivering the services offered by the least one VNF via the radio interface of the target base station to the roaming UE.

* * * * *